(12) United States Patent
Noordhuis et al.

(10) Patent No.: US 9,392,903 B2
(45) Date of Patent: Jul. 19, 2016

(54) DEVICE FOR FROTHING A LIQUID

(75) Inventors: Joeke Noordhuis, Groningen (NL);
Sipke Theo Douma, Haren (NL)

(73) Assignee: KONINKLIJKE PHILIPS N.V.,
Eindhoven (NL)

( * ) Notice: Subject to any disclaimer, the term of this patent is extended or adjusted under 35 U.S.C. 154(b) by 155 days.

(21) Appl. No.: 13/818,710

(22) PCT Filed: Aug. 30, 2011

(86) PCT No.: PCT/IB2011/053786
§ 371 (c)(1),
(2), (4) Date: Feb. 25, 2013

(87) PCT Pub. No.: WO2012/029019
PCT Pub. Date: Mar. 8, 2012

(65) Prior Publication Data
US 2013/0155804 A1      Jun. 20, 2013

(30) Foreign Application Priority Data
Sep. 3, 2010    (EP) .................................... 10175236

(51) Int. Cl.
*A47J 31/44*    (2006.01)

(52) U.S. Cl.
CPC .......... *A47J 31/4485* (2013.01); *A47J 31/4489* (2013.01)

(58) Field of Classification Search
CPC ....... A01J 11/04; A01J 11/00; A47J 31/4489; A47J 31/4485
USPC .................................................. 366/101, 107
See application file for complete search history.

(56) References Cited

U.S. PATENT DOCUMENTS

| 4,715,274 | A |   | 12/1987 | Paoletti |          |
|-----------|---|---|---------|----------|----------|
| 5,189,949 | A | * | 3/1993  | Apa      | 99/453   |
| 5,615,602 | A | * | 4/1997  | Schmed   | 99/323.1 |
| 7,836,818 | B2|   | 11/2010 | Noordhuis|          |
| 2009/0317518 | A1 |   | 12/2009 | York |          |

FOREIGN PATENT DOCUMENTS

WO    2005016095 A1    2/2005
WO    2011158171 A1    12/2011

* cited by examiner

*Primary Examiner* — Tony G Soohoo
*Assistant Examiner* — Anshu Bhatia

(57) ABSTRACT

Device (1) for frothing a liquid, comprising a chamber (10), which chamber comprises a supply tube (11) for supplying the liquid to be frothed and frothing gas, and comprises a substantially round outlet tube (12) provided at the bottom of the chamber. The outlet tube being arranged for letting out a mixture of the liquid and the frothing gas, i.e. the liquid in a frothed state, and for letting out excess frothing gas. The chamber (10) is cylinder-shaped and the supply tube (11) has a tangential arrangement with respect to the chamber (10) and is provided at a height h from the bottom of the chamber. The ratio of the value of the height (h) of the supply tube and the height (H) of the chamber is in a range between 0.2 to 0.7, and the ratio of the value of the diameter of the outlet tube (d) and the value of the diameter (D) of the chamber is in a range of 0.6 to 0.95. This device provides for a high quality of milk froth without excessive or insufficient foam formation or very coarse foam bubbles.

6 Claims, 2 Drawing Sheets

DEVICE FOR FROTHING A LIQUID

FIELD OF THE INVENTION

The present invention relates to a device for frothing a liquid, comprising a chamber which chamber comprises a supply tube for supplying the liquid to be frothed and frothing gas, and comprises a substantially round outlet tube provided at the bottom of the chamber, the outlet tube being arranged for letting out a mixture of the liquid and the frothing gas, i.e. the liquid in a frothed state, and for letting out excess frothing gas, wherein the chamber is cylinder-shaped, and wherein the supply tube has a tangential arrangement with respect to the chamber.

The present invention also relates to a method for frothing a liquid, wherein a predetermined amount of the liquid to be frothed is supplied to a chamber, wherein a gas for frothing the liquid is supplied to the chamber as well, wherein, inside the chamber, the liquid is mixed with the frothing gas, and wherein a mixture of the liquid and the frothing gas, i.e. the liquid in a frothed state, is allowed to flow out of the chamber.

BACKGROUND OF THE INVENTION

Frothing a liquid involves supplying a gas like air to the liquid and mixing the liquid with the gas, for the purpose of obtaining a mass of bubbles in the liquid, which is referred to as foam. In many cases, the liquid to be frothed is milk. Especially in the field of making coffee and coffee specialties, there is a need for a device which is capable of frothing milk in a user-friendly manner. It is a well-known option to combine a frothing process of milk with a heating process of milk, wherein air is supplied to the milk for obtaining foam, and wherein steam is supplied to the milk for increasing the temperature of the milk.

In general, it is known to supply air to be used in a frothing process of a liquid through a hole or a channel to a space where the frothing process is intended to take place. It appears in practice that such a hole or channel always gets contaminated as time passes, assuming frequent use of the device in which the frothing process takes place. In many cases, the hole or channel is relatively narrow, which renders it sensitive to contamination, wherein it is especially vulnerable to clogging with milk fats, milk stone and bacterial growth. Moreover, the hole or channel is difficult to clean as a result of a small cross-sectional area. For sake of completeness, it is noted that the inside of the hole or channel is reached by the milk under the influence of inevitable pressure fluctuations occurring during practical use.

Applicant proposes a way of solving the problems as mentioned in the foregoing, which is the subject of European patent application 10166464.7. In particular, Applicant proposes the use of a device in which the supply of gas for the purpose of frothing is not realized by using a hole or a channel providing access to a space where the frothing is supposed to take place. Instead, in the device proposed by Applicant, there are two separate spaces, wherein one of the spaces is arranged such as to receive content from another of the spaces, and wherein a free space is present between the inlet of the one space and the outlet of the other space. As a result, gas that is present in the free space as mentioned is free to enter the spaces through their openings. A flow of gas can be obtained under the influence of a flow of liquid from one space to another, wherein the gas is taken along by the liquid as a secondary flow. In any case, the openings of the spaces and the free space between the inlet of the one space and the outlet of the other space are considerably larger than conventional holes or channels for supplying air, so that clogging is virtually impossible.

In the device proposed by Applicant, the intake of frothing gas is not precisely controlled, and because of the fact that the intake is larger than in conventional situations, the amount of frothing gas is too much for the amount of liquid to be frothed. This results in an excess of air that is present in the frothing chamber. This excess of air has to be separated from the main flow of frothed milk and removed from the chamber through the outlet tube. The excess of air easily leads to negative effects such as too coarse foam on unstable and unpredictable running behavior of the milk froth.

SUMMARY OF THE INVENTION

It is an object of the present invention to provide a solution to the above-mentioned problem of the soapy and unstable foam which is obtained as a result of the improved air intake, so that the new way of taking in air can be carried out without compromising the quality of the foam. The object is achieved by means of a device for frothing a liquid according to claim 1.

The present invention is based on the insight that the height of the supply tube, the height of the chamber, the diameter of the outlet tube and the diameter of the chamber respectively are the critical dimensions of the device.

The ratio between the value of the height of the supply tube and the height of the chamber is in a range between 0.2 to 0.7, and wherein the ratio of the value of the diameter of the outlet tube and the value of the diameter of the chamber is in a range of 0.6 to 0.95 in order to produce a good quality milk froth. Exceeding the value of these ratios results in insufficient foam formation. Undershooting the value of these ratios leads to an excess of foam with very coarse bubbles. With the present invention it is possible to create foam with an acceptable quality, irrespective of the amount of frothing gas that is supplied to the chamber in which the frothing process takes place, assuming that the amount of frothing gas is more than a minimum amount that is needed for allowing the foam to be formed. For sake of completeness, it is noted that what is meant by the term "excess gas" is the gas that is not used in the frothing process, and that is too much with respect to the amount of liquid in view of predetermined quality requirements of the foam.

It is advantageous if the chamber is adapted to allow for a cyclonic separation of the mixture of the liquid and the frothing gas that is obtained during operation of the device, from excess frothing gas. By having a separation process, it is ensured that the frothed liquid on the one hand and the excess frothing gas on the other hand exit the chamber in separate flows, wherein it is not possible for the excess frothing gas to interact with the frothed liquid and influence the quality of the foam.

When the liquid and the gas are supplied to the chamber, a cyclone is obtained, which causes the liquid to interact with a portion of the gas, so that frothed liquid is formed. Under the influence of centrifugal forces, the frothed liquid is separated from the excess gas, wherein the frothed liquid moves further away from a centre of the cyclone than the excess gas.

It is noted that the use of cylinder-shaped chambers, and the tangential supply of liquid and frothing gas is known per se. For example, U.S. Pat. No. 4,715,274 discloses an emulsifying unit which comprises a emulsifying chamber having an outward dispensing opening, nozzle means defining a steam delivery channel and terminating in a nozzle positioned spaced from said chamber to define a suction chamber, a milk intake conduit and an external air intake conduit communicating with said suction chamber which in turn communicates with said emulsifying chamber whereupon steam introduced into said steam delivery channel jets out of said nozzle creating a vacuum in said suction chamber drawing milk and air into same to mix and emulsify in said emulsifying chamber and to be discharged therefrom.

In the device according to the present invention, it is also possible that steam is used for heating the liquid to be frothed, and for inducing a flow of the liquid, as is known per se from U.S. Pat. No. 4,715,274. To that end, the supply tube of the chamber may also serve for supplying steam to the chamber. In general, the supply tube may also serve for supplying pressurized gas, for inducing a flow of the liquid.

Claim 3 provides an advantageous embodiment of the present invention. This option is very well suitable in a context of a chamber which is adapted to function as a cyclonic separator, as described in the foregoing. Besides being very practical, this option has an unforeseen effect, which is very advantageous in the field of frothing and heating liquids at the same time. It appears that when outgoing flows of frothed liquid and excess frothing gas are combined, sensitivity of a final temperature of the frothed liquid to an inlet temperature of the liquid is considerably decreased. Hence, a user will not experience bothersome temperature differences when a switch is made between using liquid in a cooled state and using liquid at ambient temperature.

It is advantageous if there is a smooth transition between a wall of the chamber comprising the outlet tube and an end of the outlet tube where it is connected to said wall, wherein the smooth transition comprises a rounded surface with a radius which is in a range of 0 to 3 mm. With a smooth transition as mentioned being present, fine froth that is accumulated at the outside of the cyclone in the chamber during operation can flow more easily towards the tube.

The supply of too much air in respect of the liquid to be frothed can take place in various ways. In this respect, it is noted that it is possible for the device according to the present invention to be part of an assembly, which further comprises a liquid supply unit having an upstream arrangement with respect to the device as seen in a direction of a flow of the liquid to be frothed through the assembly, and having an outlet for allowing content from that supply unit to flow out of that supply unit, wherein the supply means of the device are open to the liquid supply unit, and are separated from the outlet of the liquid supply unit by a free space for containing the frothing gas and for allowing for a supply of the frothing gas to the supply means of the device under the influence of a flow of liquid from the liquid supply unit to the supply tube of the device. In this assembly, the intake of frothing gas is not performed through a restriction. On the contrary, there is practically a free intake of frothing gas at a position where two spaces are open to each other. For example, the supply means of the device may have an open side which faces the outlet of the liquid supply unit. When the device according to the present invention is applied in this assembly, all excess frothing gas can be discharged without a risk of the presence of too much gas affecting the froth quality.

The present invention also relates to an appliance which is suitable to be used for making a beverage such as coffee containing a frothed liquid, comprising a device according to the present invention for delivering the frothed liquid.

Furthermore, the present invention relates to a method for frothing a liquid, wherein a predetermined amount of the liquid to be frothed is supplied to a chamber, wherein a gas for frothing the liquid is supplied to the chamber as well, in an amount that is higher than an amount that is needed for frothing the amount of the liquid to a predetermined extent, wherein, inside the chamber, the liquid is mixed with only a portion of the frothing gas, wherein a mixture of the liquid and the frothing gas, i.e. the liquid in a frothed state, is allowed to flow out of the chamber, and wherein the unused frothing gas is allowed to flow out of the chamber as well.

Within the scope of the present invention, the method can have various aspects, in conformity with many of the foregoing remarks relating to the device according to the present invention. For example, the separation of the flows of the frothed liquid and the excess frothing gas may take place by performing a process of cyclonic separation of the mixture of the liquid and the frothing gas that is obtained, from the excess frothing gas, inside the chamber. Also, it is possible that the flow of the mixture of the liquid and the frothing gas out of the chamber and the flow of the unused frothing gas out of the chamber are combined, which has the advantage of decreasing a sensitivity to an inlet temperature of the liquid, In particular, the flow of the mixture of the liquid and the frothing gas out of the chamber may be made to surround the flow of the unused frothing gas out of the chamber.

The method according to the present invention involves supplying liquid to be frothed and frothing gas to a chamber. It is an option to supply pressurized gas to the chamber as well, wherein this gas may be used for inducing a flow of the liquid. According to a very practical possibility, steam may be supplied to the chamber, which may have the function of inducing a flow of the liquid as mentioned, and an additional function of heating the liquid in the process.

The above-described and other aspects of the present invention will be apparent from and elucidated with reference to the following detailed description of a device which is designed according to the principles of the present invention, and which serves for frothing milk by means of air and heating the milk by means of steam. Also, a description will be given of an application of the device in an assembly having two spaces and an abundant supply of air at a position between the spaces.

BRIEF DESCRIPTION OF THE DRAWINGS

The present invention will now be explained in greater detail with reference to the figures, in which equal or similar parts are indicated by the same reference signs, and in which.

DETAILED DESCRIPTION OF EMBODIMENTS

Figure 1:
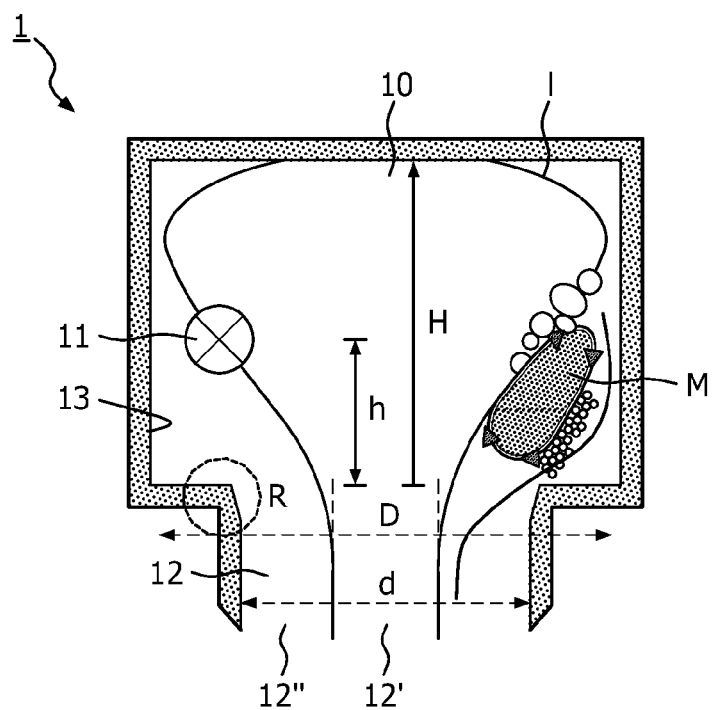
FIG. 1 diagrammatically shows a cross-section of an embodiment of a frothing device according to the present invention.
Figure 2:
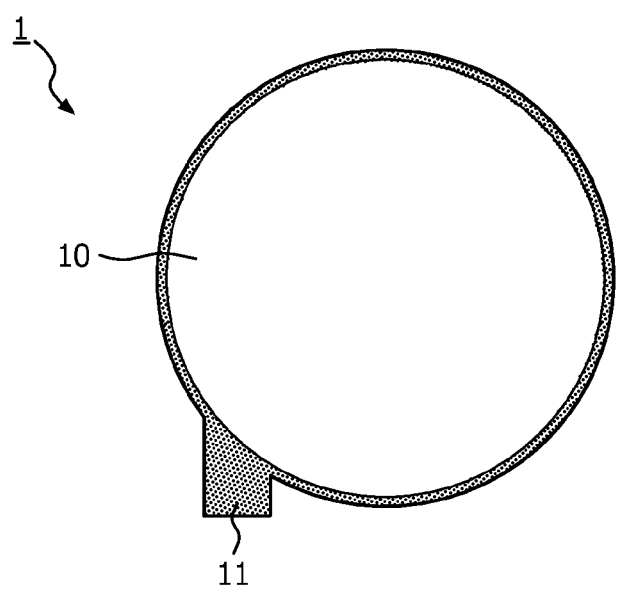
FIG. 2 diagrammatically shows a top view of the frothing device shown in FIG. 1.

FIG. 1 diagrammatically shows a cross-section of an embodiment of a frothing device 1 according to the present invention, and FIG. 2 shows a top view of the frothing device 1.

The frothing device 1 comprises a chamber 10, which is provided with a supply tube 11 and an outlet tube 12. The chamber 10 is cylinder-shaped, and has a circular circumference. The outlet tube 12 extends in a direction in which a longitudinal axis of the chamber is extending, whereas the supply tube 11 has a tangential arrangement.

The outlet tube 12 is provided at the bottom of the chamber and concentrically arranged with respect to this bottom. 'Bottom of the chamber' is defined by the device in its normal operating position.

During operation of the frothing device 1, milk, steam and air are supplied to the chamber 10, through the supply tube 11. Due to the tangential arrangement of the supply tube 11, the milk, the steam and the air collide with an interior surface 13 of the chamber 10 first, and are put in a cyclonic motion as a result of the collision and the bent shape of the interior surface 13, wherein a longitudinal axis of the cyclonic motion more or less coincides with the longitudinal axis of the chamber. The kinetic energy that is needed in the process is provided by the steam, which condenses in the milk. Due to the fact that there is motion of the milk, the steam and the air, air comes to mix with the milk, as a result of which frothed milk is obtained.

In the chamber 10, as a consequence of the cyclonic motion of the milk, the steam and the air, a separation takes place of the relatively heavy frothed milk and the relatively light air. Large air bubbles accumulate at a central position, whereas the milk froth accumulates at a position for surrounding the air bubbles. Hence, a separation takes place, wherein the air that is not used in the frothing process is separated from the frothed milk. In FIG. 1, for sake of clarity, a line 1 depicting a separation line between the excess air and the frothed milk is shown. The line 1 illustrates the fact that at a top side of the chamber 10, it is mostly air that is present there, which is logical in view of the fact that only the air tends to go up, whereas the frothed milk tends to go down. However, downwards from the supply tube 11, there is a considerable amount of milk froth besides the air. When the combined flow of frothed milk and excess air is let out of the chamber 10, the air is free to escape, and the frothed milk can be received in a cup or the like. In FIG. 1, the path which is followed by the frothed milk on its way out is indicated by means of a bent arrow. Furthermore, the central portion of the outlet tube 12 through which the excess air is let out is indicated by means of dashed lines in FIG. 1, wherein that portion of the outlet tube 12 is indicated by means of reference numeral 12', and wherein the other portion of the outlet tube 12, which has a function in letting out the frothed milk, is indicated by means of reference numeral 12".

It follows from the foregoing that the chamber 10 of the frothing device 1 is designed such as to function as a separator, in which both centrifugal and cyclonic separation methods are applied. The design of this chamber 10 is different from conventional designs. In known separators, the inlet is fed with a flow of gas or liquid, which serves as a continuous phase, in which another liquid or solid particles are dispersed. In this application, the continuous phase is steam, which during the frothing process will fully condense on the milk, which is the liquid phase. A third flow is the air, of which a portion should not mix with the milk. The air phase is also a continuous phase, probably already mixing with the steam.

Because of a phase transition of the steam, a volumetric input flow rate is much less than an output flow rate. This means that quite some kinetic energy is put into the separator, which is used to supply the energy that is needed for dispersing some of the air into the milk. Still, the frothed milk leaves the chamber 10 in a gentle way, driven by gravity through an outlet tube 12 in the bottom. The outlet which is present at the top in conventional separators for letting out the continuous phase is not needed, as all of the steam has condensed into the milk at the end of the frothing process. The excess air that was forced to the center of the cyclone leaves the cyclone through the same outlet tube 12 as the frothed milk. At this position, the flow is so gentle that no further mixing/dispersion takes place.

In the shown example, the outlet tube 12 has a relatively large diameter compared to known frothing chambers. In general, the value of a diameter of an outlet of a device for frothing milk is below 10 mm. However, in the application with excess air, a large outlet tube 12 is advantageous, as such an outlet tube 12 is capable of accommodating a flow of the frothed milk as well as a flow of excess air, and is also capable of guaranteeing the prevention of blowing bubbles in the outlet tube 12. It is noted that in FIG. 1, the diameter of the outlet tube 12 is indicated by a two-headed arrow d.

It is noted that in FIG. 1, the diameter of the chamber 10 is indicated by a two-headed arrow D. The height of the chamber 10 is indicated by H. The height of the supply tube 11 from the bottom of the supply tube is indicated by h.

As has already been mentioned, the supply tube 11 is positioned tangentially with respect to the chamber 10. In this way, maximum rotation speed is realized.

The dimensions d, D, h and H are critical in obtaining a high quality milk froth. The ratio of the value of the height (h) of the supply tube and the height (H) of the chamber is in a range between 0.2 to 0.7, and the ratio of the value of the diameter of the outlet tube (d) and the value of the diameter (D) of the chamber is in a range of 0.6 to 0.95.

The table below provides for a number of advantageous combinations for the dimensions d, D, h and H.

| D | d | H | h |
|---|---|---|---|
| 18 | 17 | 12 | 3 |
| 18 | 15 | 20 | 10 |
| 14 | 12 | 16 | 6 |
| 14 | 10 | 24 | 14 |

With these dimensions a high quality milk froth can be obtained having a percentage of foam of approximately 50%.

Another parameter that can have an effect on the process inside the chamber 10 is a radius at the position where the outlet tube 12 is connected to the chamber 10, which is indicated by R in FIG. 1. When this radius R has a relatively large value, the fine foam that is accumulated at an outside of the cyclone can flow more easily towards the outlet tube 12. By choosing suitable values for the ratio of the diameters d, D of the outlet tube 12 and the chamber 10, and the radius R, an appropriate resistance for the foam to flow from the outside of the cyclone to the outlet tube 12 can be set. Furthermore, a height of the chamber 10 can be chosen such that the entire chamber 10 is used for temporarily storing the frothed milk and allowing the separation process to take place. Also, the diameter d of the outlet tube 12 can be large enough to not be blocked by the frothed milk.

Inside the chamber 10, during use, there can be a secondary rotational movement of the frothed milk, which helps in realizing the separation process. In FIG. 1, this movement is diagrammatically indicated by means of arrow heads in an oval-shaped area M. The secondary rotational movement has a function in preventing that coarse foam is drawn into the direction of the outlet tube 12, as this movement can cause coarse foam to be stored in a stable ring, so that there is an opportunity inside the chamber 10 for bubbles to collapse.

The excess air can be supplied in various ways. For example, the air can be introduced into the chamber 10 by an air pump, or by two separate venturis, wherein both venturis may be steam-driven, wherein one of the venturis may be used for supplying liquid to be frothed, and wherein another of the venturis may be used for supplying an abundant amount of air.

Figure 3:
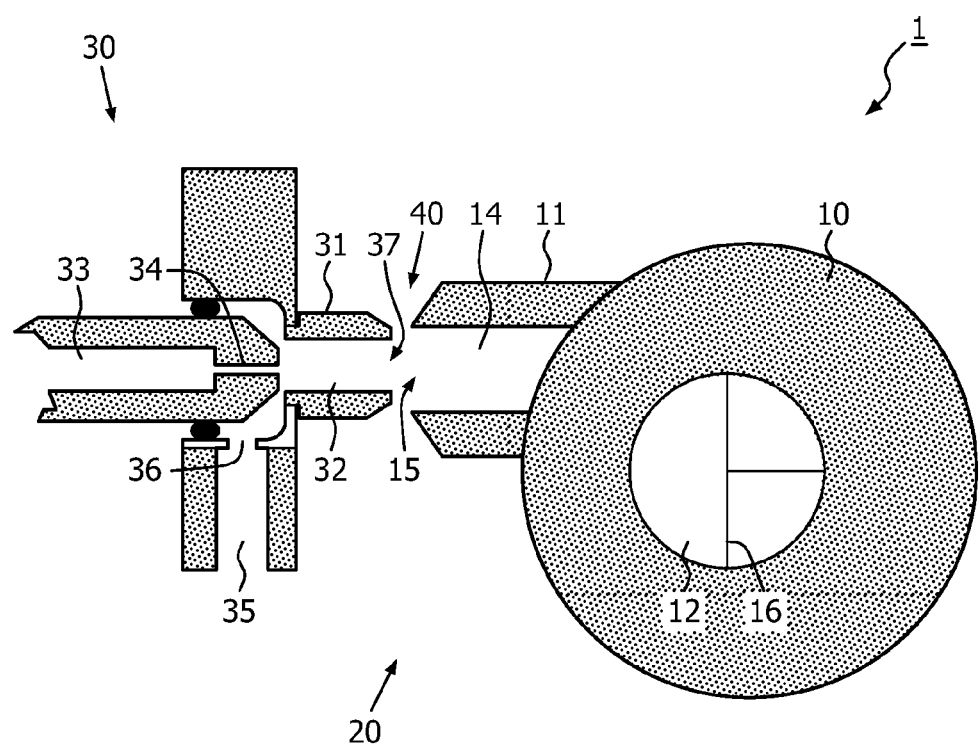
FIG. 3 illustrates the application of an embodiment of the frothing device according to the present invention in an assembly which further comprises a liquid supply unit.

Another way in which an abundant supply of air can be obtained will now be described on the basis of FIG. 3, in which an assembly 20 of which the frothing device 1 according to the present invention may be part is diagrammatically shown.

Besides the frothing device 1, the assembly 20 comprises a liquid supply unit 30. This unit 30 comprises an outlet nozzle 31 having an internal space 32, a steam supply channel 33 which is connected to the internal space 32 through a constriction 34, and a milk supply channel 35 which is connected to the internal space 32 through a restriction 36 as well, and which is extending perpendicular to the steam supply channel 33. However, the liquid supply unit 30 does not comprise an air supply channel. When the device 20 is operated, a frothing process does not take place in the internal space 32 of the outlet nozzle 31 of the liquid supply unit 30. Instead, a mixture of steam and milk is obtained, wherein the milk is drawn into the internal space 32 under the influence of the steam, and is heated by the steam. Furthermore, the mixture of steam and milk is discharged as a jet through an open side 37 of the internal space 32, which serves as an outlet 37 of the internal space 32.

Like the outlet nozzle 31 of the liquid supply unit 30, the supply tube 11 of the frothing device 1 has an internal space 14 and an open side 15 allowing access to the internal space 14 from the outside. The open side 15 as mentioned is present at a distance from the open side 37 of the internal space 32 of the outlet nozzle 31 of the liquid supply unit 30, in a concentric arrangement with the open side 37 of the internal space 32 of the outlet nozzle 31 of the liquid supply unit 30, wherein the open sides 15, 37 of the spaces 14, 32 are separated by a free space 40, i.e. by air. Hence, when a jet of a mixture of steam and milk flows from the liquid supply unit 30, this jet crosses the free space 40, and is received by the supply tube 11 of the frothing device 1, wherein the open side 15 of the internal space 14 of the supply tube 11 serves as an inlet 15 of the space 14. It should be noted that at the time of the crossing of the free space 40, only part of the steam has condensed onto the milk. Therefore, it is justified to still mention a mixture of steam and milk.

Under the influence of the jet of the mixture of steam and milk, air is drawn into the internal space 14 of the supply tube 11 of the frothing device 1. In order to prevent sputtering, the open side 15 of the space 14 as mentioned has a larger area than the open side 37 of the space 32 of the liquid supply unit 30. The suction effect of the jet on the air may be quite low, but due to the fact that air can simply enter the internal space 14 of the supply tube 11 of the frothing device 1 from the free space 40, it is possible for the effect to be sufficient for actually causing a desired ingoing flow of air.

In the frothing device 1, the portion of the steam that has not condensed onto the milk in the liquid supply unit 30 condenses onto the milk after all. Furthermore, a frothing process of the milk takes place, so that as the flow continues, frothed hot milk is obtained, wherein the excess air is separated from the frothed hot milk, as has already been described in the foregoing. FIG. 3 illustrates a practical option of applying a cross 16 inside the outlet tube 12 of the frothing device 1. On the basis of the presence of the cross 16, the rotational movement of the outgoing flows is stopped.

A notable feature of the assembly 20 is the fact that the supply or air does not require the application of an air supply channel. Instead, a jet of a mixture of steam and milk is made to cross a distance between two spaces 14, 32, wherein an airflow is induced in that process. This means that the assembly 20 does not need an air supply channel. On the basis of this fact, there will be no problems of clogging as far as the supply of air is concerned. The free space 40 is simply too large. On the other hand, excess air is introduced into the frothing device 1, but this does not influence the quality of the frothed product as an advantageous result of the application of the frothing device 1 according to the present invention, which is adapted to function as a separator of frothed liquid and frothing gas.

For sake of completeness, it is noted that the steam supply channel 33 of the assembly 20 may be connected to any suitable means for delivering steam. Furthermore, the milk may be taken from any suitable reservoir.

At the position where the open sides 15, 37 of the spaces 14, 32 of the liquid supply unit 30 and the frothing device 1 face each other, these components 1, 30 of the assembly 20 are separated by air. However, that does not alter the fact that these components 1, 30 may be interconnected at one or more other positions, and may be arranged in one supporting frame, for example. Basically, the frothing device 1 and the liquid supply unit 30 are individual units 1, 30 as far as their internal spaces 14, 32 are concerned, as these spaces 14, 32 are separated by air.

On the basis of the fact that the assembly 20 comprises the frothing device 1 which is adapted to be used as a separator of excess frothing gas and frothed liquid, a most practical and advantageous functioning of the assembly 20 is obtained, wherein the advantage of avoiding clogging of the intake of the frothing gas is combined with a possibility of realizing a desired froth quality by separating excess air from the frothed liquid and discharging the excess air from the frothing device 1 having the appropriate dimensions.

It will be clear to a person skilled in the art that the scope of the present invention is not limited to the examples discussed in the foregoing, but that several amendments and modifications thereof are possible without deviating from the scope of the present invention as defined in the attached claims. While the present invention has been illustrated and described in detail in the figures and the description, such illustration and description are to be considered illustrative or exemplary only, and not restrictive. The present invention is not limited to the disclosed embodiments.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the present invention.

For sake of completeness, it is noted that the terms "froth" and "foam" as used in this text are closely related, and are used as synonyms.

When a comparison is made between the frothing device 1 according to the present invention and the emulsifying unit known from U.S. Pat. No. 4,715,274, the following important differences are found:

The known unit is fed with an amount of air that is precisely adapted to the amount of liquid to be frothed, whereas the device 1 according to the present invention is fed with too much air;

In the known unit, the rotation movement of the fluids serves for refinement of foam, whereas in the device 1 according to the present invention, there is also an effect of cyclonic separation of the excess air from the frothed liquid; and In the known unit, the outlet is not larger than necessary for letting out the frothed liquid, whereas in the device 1 according to the present invention, the outlet 12 is large enough for letting out the frothed liquid and allowing for excess air removal.

The invention claimed is:

1. A device for frothing a liquid, comprising:
   a chamber comprising a single input supply tube for supplying the liquid to be frothed, air and a frothing gas, the supply tube comprising an internal space and an open side serving as an inlet of the open space, thereby allowing access to the internal space from an outlet nozzle of a liquid supply unit supplying the liquid to be a frothed, the frothing gas, and air drawn into the internal space across a free space separating the internal space of the outlet nozzle of the liquid supply unit and the internal space of the supply tube, wherein the air is drawn into the supply tube across the free space under the influence of a jet stream of the mixture of the liquid to be frothed and the frothing gas, and
   a substantially round outlet tube provided at the bottom of the chamber, the outlet tube being arranged for letting out a mixture of the liquid and the frothing gas, and for letting out excess frothing gas,
   wherein the chamber is cylinder-shaped,
   wherein the supply tube has a tangential arrangement with respect to the chamber and is provided at a height (h) from the bottom of the chamber,
   wherein the ratio of the value of the height (h) of the supply tube and the height (H) of the chamber is in a range between 0.2 to 0.7, and
   wherein the ratio of the value of the diameter of the outlet tube (d) and the value of the diameter (D) of the chamber is in a range of 0.6 to 0.95,
   wherein the outlet tube is constituted by a central portion for letting out excess frothing gas and a non-central portion for letting out the mixture of the liquid and the frothing gas, the non-central portion circumscribing the central portion.

2. The device according to claim 1, wherein the outlet tube (12) is concentrically arranged with respect to the bottom of the chamber (10).

3. The device according to claim 1, wherein there is a smooth transition between a wall of the chamber comprising the outlet tube and an end of the outlet tube where it is connected to said wall, and wherein the smooth transition comprises a rounded surface with a radius (R) which is in a range of 0 to 3 mm.

4. An appliance which is suitable to be used for making a beverage containing a frothed liquid, comprising a device for frothing a liquid according to claim 1.

5. An Assembly for frothing a liquid,
   comprising a device for frothing a liquid, comprising:
   a chamber comprising a single input supply tube for supplying the liquid to be frothed, air and a frothing gas, the supply tube comprising an internal space and an open side serving as an inlet of the open space, thereby allowing access to the internal space from an outlet nozzle of a liquid supply unit supplying the liquid to be frothed, the frothing gas, and air drawn into the internal space across a free space separating the internal space of the outlet nozzle of the liquid supply unit and the internal space of the supply tube, wherein the air is drawn into the supply tube across the free space under the influence of a jet stream of the mixture of the liquid to be frothed and the frothing gas, and
   a substantially round outlet tube provided at the bottom of the chamber, the outlet tube being arranged for letting out a mixture of the liquid and the frothing gas, and for letting out excess frothing gas,
   wherein the chamber is cylinder-shaped,
   wherein the supply tube has a tangential arrangement with respect to the chamber and is provided at a height (h) from the bottom of the chamber,
   wherein the ratio of the value of the height (h) of the supply tube and the height (H) of the chamber is in a range between 0.2 to 0.7, and
   wherein the ratio of the value of the diameter of the outlet tube (d) and the value of the diameter (D) of the chamber is in a range of 0.6 to 0.95,
   wherein the outlet tube is constituted by a central portion for letting out excess frothing gas and a non-central portion for letting out the mixture of the liquid and the frothing gas, the non-central portion circumscribing the central portion,
   the assembly further comprising:
   a liquid supply unit having an upstream arrangement with respect to the device as seen in a direction of a flow of the liquid to be frothed through the assembly, and
   an outlet for allowing content from a supply unit to flow out of the supply unit,
   wherein the supply tube of the device is open to the liquid supply unit, and is separated from the outlet of the liquid supply unit by a free space for containing the frothing gas and for allowing for a supply of the frothing gas to the supply tube of the device under the influence of a flow of liquid from the liquid supply unit to the supply tube.

6. The assembly according to claim 5, wherein the supply tube of the device have an open side which faces the outlet of the liquid supply unit.

* * * * *